United States Patent Office 3,129,025
Patented Apr. 14, 1964

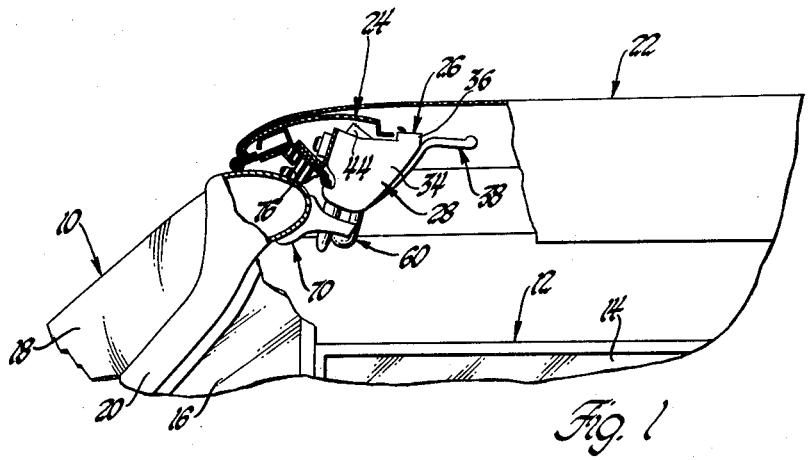

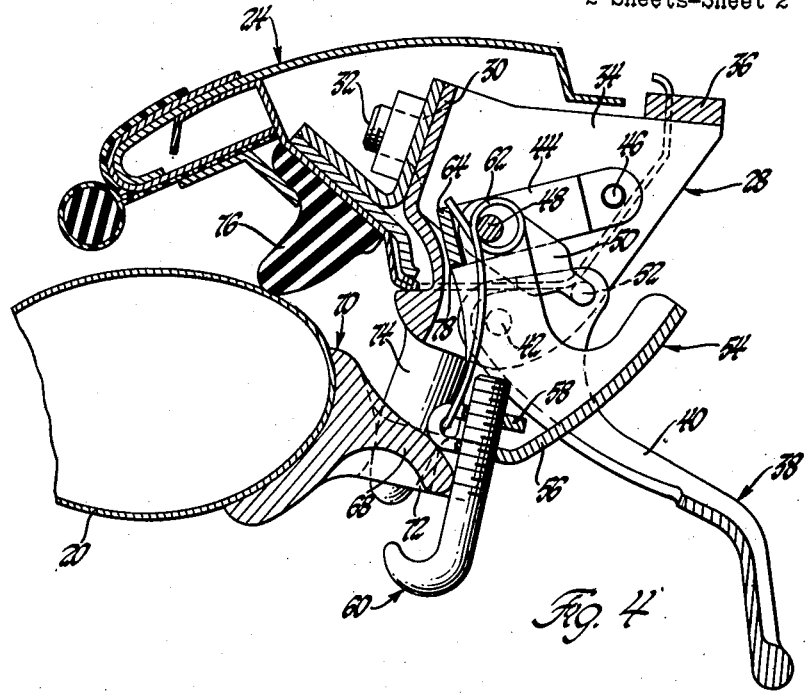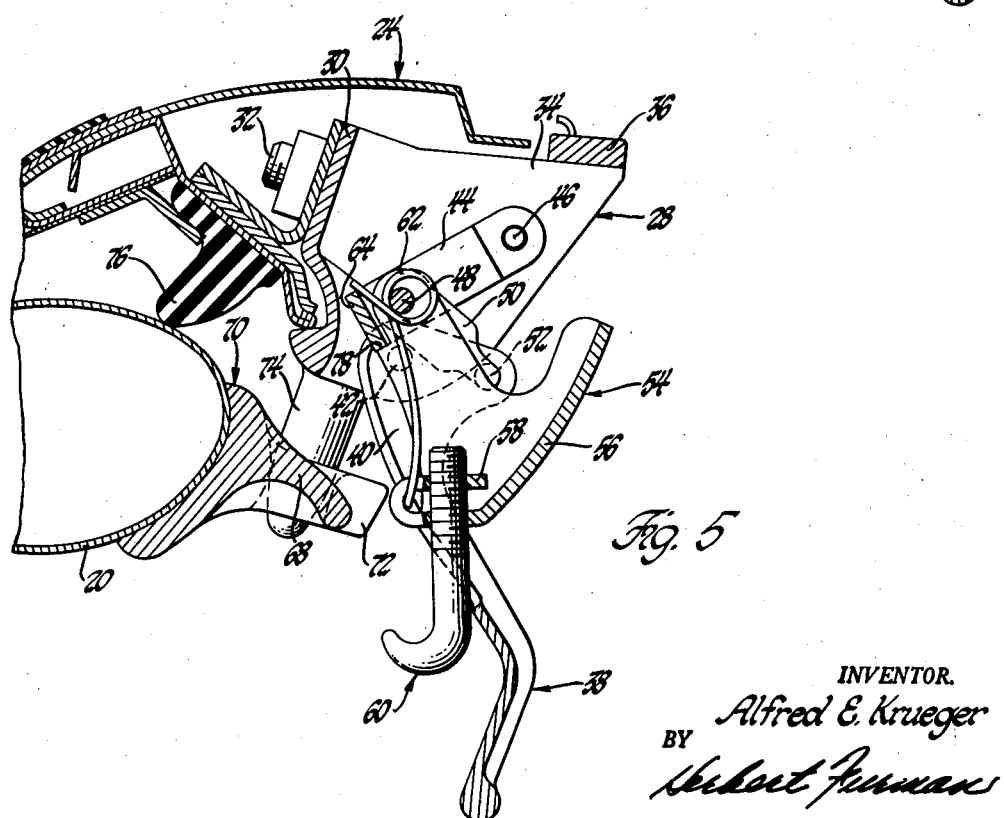

3,129,025
CONVERTIBLE TOP HEADER LATCH
Alfred E. Krueger, Detroit, Mich., assignor to General Motors Corporation, Detroit, Mich., a corporation of Delaware
Filed Aug. 27, 1962, Ser. No. 219,450
7 Claims. (Cl. 292—97)

This invention relates to closure latches and more particularly to convertible top header latches.

One feature of this invention is that it provides an improved convertible top header latch of the overcenter type. Another feature of this invention is that it provides a convertible top header latch which includes a manual handle swingably mounted on a latch support member and connected to one of a pair of articulated links, with a latch assembly being mounted upon the joint of the links and with one of the links and the handle forming an overcenter type toggle linkage in the latched position of the latch assembly. A further feature of this invention is that it provides a convertible top header latch including a manually operable bifurcated handle pivoted on a latch support member and connected to one of a pair of articulated links, a latch bolt assembly pivotally mounted on the joint of the links for movement between the legs of the handle, with one of the links and the handle forming an overcenter type toggle linkage in the latched position of the bolt assembly and with the latch bolt assembly closing the opening between the legs of the handle in the latched position of the bolt assembly. Yet another feature of this invention is that it provides a convertible top header latch which includes a manually operable handle swingably mounted on a latch support member, a pair of articulated links, one of which is pivoted to the handle and the other of which is pivoted to the latch support member, a latch bolt assembly swingably mounted on the joint of the links for movement between latched, unlatched and safety positions, with one of the links and the handle forming a toggle linkage which moves the bolt assembly between latched and safety positions with respect to a striker assembly, and with the other of the links moving the bolt assembly between safety and unlatched positions.

These and other features and advantages will be readily apparent from the following specification and drawings, wherein:

FIGURE 1 is a partially broken away partial side elevational view of a convertible vehicle body having a convertible top mounted thereon for movement between raised and lowered positions and including a convertible top header latch according to this invention for latching the top header to the windshield header in the raised position of the top;

FIGURE 2 is an enlarged partially broken away view of a portion of FIGURE 1 showing the latch in latched position;

FIGURE 3 is a sectional view taken generally along the plane indicated by line 3—3 of FIGURE 2;

FIGURE 4 is a view similar to FIGURE 2 showing the latch in safety position, and FIGURE 5 is a view similar to FIGURE 2 showing the latch in unlatched position.

Referring now particularly to FIGURE 1 of the drawings, a convertible type vehicle body 10 includes a front door 12 having a vertically movable door window 14 and a swingable ventilation window 16. Body 10 further includes a windshield 18 having its lower edge mounted on the body and its upper and side edges housed within a windshield header 20. A conventional convertible top 22 is mounted on the body 10 for movement between a raised position, as shown, and a lowered position, not shown. Top 22 includes a top header 24 which rests on the windshield header 20 in the raised position of the top and is latched thereto by a convertible top header latch generally designated 26 according to this invention.

Referring now to FIGURES 2 through 5 of the drawings, the latch 26 generally includes a U-shaped housing 28 having the forward wall 30 thereof bolted at 32 to the top header 24. The side walls 34 of the housing 28 are interconnected by a cross bar 36 formed integrally therewith. An operating handle 38 includes a pair of legs 40 pivotally mounted on studs 42 staked in aligned openings in the side walls 34 of the housing. A generally U-shaped control link 44 has the legs thereof swingably mounted on aligned studs 46 which are staked within openings in the side walls of the housing. A pin 48 extends between the legs of the link, and a pair of offset toggle links 50 are mounted on the pin 48. The lower ends of the links 50 are formed into laterally extending bosses or legs 52 which are rotatably received within aligned openings provided in each leg 40 of the handle 38. A latch bolt assembly generally comprises a U-shaped latch support member 54 having the legs thereof swingably mounted on the pin 48, FIGURE 3, and locating the links 50 adjacent the legs of the link 44. The outer wall 56 of member 54 fits between the legs 40 of the handle 38 in the latched position of the latch, as shown in FIGURE 2, to close the opening between the legs, with wall 56 being shaped so as to continue the outer contour of the latch assembly. The wall 56 includes a return bent flange 58 which is provided with a tapped opening aligned with a tapped opening in the wall 56 so as to adjustably mount a threaded hook type latch bolt 60 on member 54. A coil torsion spring 62 surrounds the pin 48 intermediate the legs of the member 54, with one end of the spring bearing against the base 64 of link 44 and the other bent end of the spring bearing against flange 58 so as to continually bias member 54 in a clockwise direction about the pin 48.

The bolt 60 is adapted to engage under an arcuately-shaped lip 68 of a striker assembly 70 which is secured in a suitable manner to the windshield header 20. The striker assembly 70 further includes an apertured lip 72 which is adapted to receive a guide pin 74 formed integral with the housing 28 to thereby locate the top header 24 with respect to the windshield header in the raised position of the top.

When the latch is in latched position, as shown in FIGURE 2, the axis of the legs 52 is slightly overcenter or to the left of a line through the axes of the pins 42 and 48, with the axis of the legs 52 being so located by engagement of the handle 38 with the cross bar 36. The spring 62 biases the link 44 in a counterclockwise direction and the member 54 in a clockwise direction about the pin 48, and the bolt 60 is held in rattle-proof tight engagement with the lip 68 by the sealing pressure exerted by the header weatherstrip 76 against the windshield header 20.

If it is desired to move the latch to the safety position thereof, as shown in FIGURE 4, handle 38 is grasped and moved downwardly or clockwise about the pins 42. As the handle moves in this direction, the links 50 swing counterclockwise about pins 52 or fold with respect to the handle 38, and once the overcenter relationship of the axis of the legs 52 with respect to the pins 42 and 48 is broken, the spring 62 will aid the folding movement of the links 50 with respect to the handle 38 and unfolding movement of the links 50 with respect to the link 44 as the links 50 swing counterclockwise about their legs 52 and the link 44 swings in the same direction about the pins 46. The hook of the bolt moves downwardly and out of engagement with the lip 68 as the shank of the bolt slides along the edge of the lip under the action of spring 62. When the latch is in safety position, the base 64 of the link 44 will engage a shoulder 78 of the member 54 under the section of the spring 62. The latch will remain in this position upon release of the handle 38.

If it is desired to move the latch to unlatched position, handle 38 is moved further clockwise about the axis of the pins 42 to its position, as shown in FIGURE 5. During this movement of the handle, the links 50 will continue to fold with respect to the handle 38 or swing counterclockwise about legs 52 to swing the link 44 further in the same direction about the pins 46. Due to the engagement of the base 64 of the link 44 with the shoulder 78, the link 44 and member 54 will be swung counterclockwise about the pins 46 as a unit to thereby move the bolt 60 away from the lip 68 so that the top can thereafter be moved to a lowered position. The latch must be manually returned to safety position since the spring 62 has no effect on movement of the latch once link 44 engages member 54. The latch 38 is normally placed in its safety position during the raising and lowering movement of the top.

When the top is moved from a lowered position to a raised position immediately adjacent the windshield header 20, the lower surface of the bolt 60 will engage the upper surface of the lip 68 so that the member 54 and link 44 will swing counterclockwise about the pin 46 to move the latch to unlatched position as the bolt moves past the lip 68 to its position with respect thereto, as shown in FIGURE 5. Thereafter, the handle 38 is moved upwardly to move the latch to its latched position wherein the legs 52 will be in their overcenter relationship to the pins 42 and 48, as previously described.

Thus, this invention provides a new and improved convertible top header latch.

What is claimed is:

1. A closure latch comprising, in combination, a latch support member, an operating member pivotally mounted on said support member, a pair of articulated links, means pivotally connecting one of said links to said support member, means pivotally connecting the other of said links to said operating member, a latch bolt assembly pivotally mounted on said links for movement between latched and unlatched positions, the pivot of said one link to said operating member being to one side of a line through the pivot of said operating member to said support member and the pivotal joint of said links in the latched position of said bolt assembly.

2. A closure latch comprising, in combination, a latch support member, an operating member pivotally mounted on said support member, a pair of articulated links, means pivotally connecting one of said links to said support member, means pivotally connecting the other of said links to said operating member, a latch bolt assembly pivotally mounted on the joint of said links for movement between latched and unlatched positions, means biasing said bolt assembly to latched position, and means on one of said links for limiting movement of said bolt assembly relative thereto under the action of said biasing means.

3. A closure latch for latching a pair of members to each other wherein one of said members includes striker means comprising, in combination, a latch support member mounted on the other of said members, an operating member pivotally mounted on said support member, a pair of articulated links, means pivotally connecting one of said links to said support member, means pivotally connecting the other of said links to said operating member, and a latch bolt assembly pivotally mounted on said links for lateral movement relative to said striker means between latched and safety positions, and swinging movement relative to said striker means between safety and unlatched positions upon operation of said handle and movement of said links.

4. A closure latch comprising, in combination, a latch support member, an operating member including a pair of spaced legs, means swingably mounting said operating member on said support member, a pair of articulated links, means pivotally connecting one of said links to said operating member, means pivotally connecting the other of said links to said support member, a latch bolt assembly swingably mounted on the pivotal joint of said links for swinging movement between the legs of said operating member to latched, unlatched and safety positions, and means on said latch bolt assembly for closing the space between the legs of said operating member in the latched position of said bolt assembly.

5. A closure latch for latching a closure member to a vehicle body member having striker means mounted thereon comprising, in combination, a latch support member mounted on said closure member, an operating member pivotally mounted on said support member, a pair of articulated links, one link being pivotally secured to said operating member and the other link being pivotally secured to said support member, a latch bolt assembly swingably mounted on the joint of said links, spring means interconnecting said other link and said bolt assembly to bias said other link and bolt assembly toward each other and bias said bolt assembly toward said striker means, movement of said operating member relative to said support member folding said links with respect to each other to move said bolt assembly from latched to safety position as said bolt assembly and said other link move toward each other, and means on said other link and said latch bolt assembly engageable with each other in said safety position of said latch bolt assembly.

6. A closure latch for latching a closure member to a vehicle body member having striker means mounted thereon comprising, in combination, a latch support member mounted on said closure member, an operating member pivotally mounted on said support member, a pair of articulated links, one link being pivotally secured to said operating member and the other link being pivotally secured to said support member, a latch bolt assembly swingably mounted on the joint of said links, spring means interconnecting said other link and said bolt assembly to bias said bolt assembly toward said striker means and to bias said bolt assembly and said other link toward each other, movement of said operating member relative to said support member folding said links with respect to each other to move said bolt assembly from latched to safety position, said spring means maintaining said bolt assembly in engagement with the striker means during movement thereof to said safety position, and means on said other link engageable with said bolt assembly in said safety position, said latch bolt assembly and said other link being movable as a unit above the pivot of said other link on said support member to move said bolt assembly to unlatched position.

7. A closure latch for latching a closure member to a vehicle body member having striker means mounted thereon comprising, in combination, a latch support member mounted on said closure member, an operating member pivotally mounted on said support member, a pair of articulated links, one of said links being pivotally secured to said operating member and the other of said links being pivotally secured to said support member, a latch bolt assembly swingably mounted on the joint of said links, spring means interconnecting said other of said links and said bolt assembly to bias said bolt assembly toward said striker means and to bias said other of said links toward said bolt assembly, the pivot of said one of said links to said operating member being to one side of a line through the pivot of said operating member to said support member and the pivotal joint of said links in the latched position of said bolt assembly, movement of said operating member relative to said support member moving said pivot of said one of said links to the other side of said line to fold said links with respect to each other to move said bolt assembly from latched to safety position and to move said other of said links toward said bolt assembly, and cooperating means on said other of said links and said latch bolt assembly to limit the action of said spring means upon movement of said bolt assembly to said safety position.

References Cited in the file of this patent

UNITED STATES PATENTS 3,082,030 Duluk et al. _____ Mar. 19, 1963

FOREIGN PATENTS 751,911 Great Britain _____ July 4, 1956

UNITED STATES PATENT OFFICE
CERTIFICATE OF CORRECTION

Patent No. 3,129,025                                          April 14, 1964

Alfred E. Krueger

It is hereby certified that error appears in the above numbered patent requiring correction and that the said Letters Patent should read as corrected below.

Column 3, line 4, for "section" read -- action --; column 4, line 53, for "above" read -- about --.

Signed and sealed this 4th day of August 1964.

(SEAL)
Attest:

ERNEST W. SWIDER
Attesting Officer

EDWARD J. BRENNER
Commissioner of Patents